(12) United States Patent
Vaden

(10) Patent No.: US 10,395,119 B1
(45) Date of Patent: Aug. 27, 2019

(54) SYSTEMS AND METHODS FOR DETERMINING ACTIVITIES PERFORMED DURING VIDEO CAPTURE

(71) Applicant: GOPRO, INC., San Mateo, CA (US)

(72) Inventor: Mark Vaden, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 118 days.

(21) Appl. No.: 15/233,559

(22) Filed: Aug. 10, 2016

(51) Int. Cl.
*G06K 9/00* (2006.01)
*G06T 11/20* (2006.01)
*G06T 7/20* (2017.01)

(52) U.S. Cl.
CPC ..... *G06K 9/00718* (2013.01); *G06K 9/00744* (2013.01); *G06K 9/00724* (2013.01); *G06K 2009/00738* (2013.01); *G06T 7/20* (2013.01); *G06T 11/206* (2013.01); *G06T 2207/10016* (2013.01); *G06T 2207/30221* (2013.01); *G06T 2207/30241* (2013.01)

(58) Field of Classification Search
CPC . G06T 2207/30221; G06T 7/248; G06T 7/74; G06T 2207/10016; G06T 2207/30241; G06T 7/20; G06T 11/206; A63F 2300/69; G06K 2209/23; G06K 9/00724; G06K 9/00771; G06K 9/00718; G06K 9/00744; G06K 2009/00738
See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Kenny A Cese
(74) *Attorney, Agent, or Firm* — Esplin & Associates, PC

(57) ABSTRACT

Systems and method of determining one or more activities performed during video capture are presented herein. Information defining a video may be obtained. The information defining the video may include content information, metadata information, and/or other information. The content information may define visual content of the video and/or other content of the video. The metadata information may include tracking information and/or other information. The tracking information may locations of the capture device as a function of progress through the video. One or more activity types being performed by an entity moving with the capture device during the previous capture may be deter- (Continued)

mined based on the tracking information. For example, a location graph may be generated from the tracking information. The location graph may be used to determine one or more activity types that were performed.

20 Claims, 4 Drawing Sheets

(56) References Cited

U.S. PATENT DOCUMENTS

| | | | |
|---|---|---|---|
| 7,885,426 | B2 | 2/2011 | Golovchinsky |
| 7,970,240 | B1 | 6/2011 | Chao |
| 8,180,161 | B2 | 5/2012 | Haseyama |
| 8,396,878 | B2 | 3/2013 | Acharya |
| 8,446,433 | B1 | 5/2013 | Mallet |
| 8,606,073 | B2 | 12/2013 | Woodman |
| 8,611,422 | B1 | 12/2013 | Yagnik |
| 8,612,463 | B2 | 12/2013 | Brdiczka |
| 8,718,447 | B2 | 5/2014 | Yang |
| 8,763,023 | B1 | 6/2014 | Goetz |
| 8,774,560 | B2 | 7/2014 | Sugaya |
| 8,971,623 | B2 | 3/2015 | Gatt |
| 8,990,328 | B1 | 3/2015 | Grigsby |
| 9,041,727 | B2 | 5/2015 | Ubillos |
| 9,077,956 | B1 | 7/2015 | Morgan |
| 9,142,257 | B2 | 9/2015 | Woodman |
| 9,253,533 | B1 | 2/2016 | Morgan |
| 9,342,376 | B2 | 5/2016 | Jain |
| 9,396,385 | B2 | 7/2016 | Bentley |
| 9,418,283 | B1 | 8/2016 | Natarajan |
| 2002/0165721 | A1 | 11/2002 | Chang |
| 2004/0001706 | A1 | 1/2004 | Jung |
| 2004/0128317 | A1 | 7/2004 | Sull |
| 2005/0025454 | A1 | 2/2005 | Nakamura |
| 2005/0108031 | A1 | 5/2005 | Grosvenor |
| 2005/0198018 | A1 | 9/2005 | Shibata |
| 2006/0080286 | A1 | 4/2006 | Svendsen |
| 2006/0115108 | A1 | 6/2006 | Rodriguez |
| 2007/0204310 | A1 | 8/2007 | Hua |
| 2007/0230461 | A1 | 10/2007 | Singh |
| 2008/0044155 | A1 | 2/2008 | Kuspa |
| 2008/0123976 | A1 | 5/2008 | Coombs |
| 2008/0152297 | A1 | 6/2008 | Ubillos |
| 2008/0163283 | A1 | 7/2008 | Tan |
| 2008/0177706 | A1 | 7/2008 | Yuen |
| 2008/0183843 | A1 | 7/2008 | Gavin |
| 2008/0186330 | A1* | 8/2008 | Pendleton ............... A63F 13/10 345/619 |
| 2008/0253735 | A1 | 10/2008 | Kuspa |
| 2008/0313541 | A1 | 12/2008 | Shafton |
| 2009/0019995 | A1 | 1/2009 | Miyajima |
| 2009/0027494 | A1* | 1/2009 | Cavallaro ............ G06K 9/6202 348/135 |
| 2009/0125559 | A1 | 5/2009 | Yoshino |
| 2009/0213270 | A1 | 8/2009 | Ismert |
| 2009/0252474 | A1 | 10/2009 | Nashida |
| 2010/0046842 | A1 | 2/2010 | Conwell |
| 2010/0086216 | A1 | 4/2010 | Lee |
| 2010/0104261 | A1 | 4/2010 | Liu |
| 2010/0183280 | A1 | 7/2010 | Beauregard |
| 2010/0199182 | A1 | 8/2010 | Lanza |
| 2010/0231730 | A1 | 9/2010 | Ichikawa |
| 2010/0245626 | A1 | 9/2010 | Woycechowsky |
| 2010/0251295 | A1 | 9/2010 | Amento |
| 2010/0271367 | A1* | 10/2010 | Vaden ................... G06T 19/006 345/420 |
| 2010/0274714 | A1 | 10/2010 | Sims |
| 2010/0278504 | A1 | 11/2010 | Lyons |
| 2010/0278509 | A1 | 11/2010 | Nagano |
| 2010/0281375 | A1 | 11/2010 | Pendergast |
| 2010/0281386 | A1 | 11/2010 | Lyons |
| 2010/0318660 | A1 | 12/2010 | Balsubramanian |
| 2011/0075990 | A1 | 3/2011 | Eyer |
| 2011/0093798 | A1 | 4/2011 | Shahraray |
| 2011/0103700 | A1 | 5/2011 | Haseyama |
| 2011/0137156 | A1 | 6/2011 | Razzaque |
| 2011/0170086 | A1 | 7/2011 | Oouchida |
| 2011/0206351 | A1 | 8/2011 | Givoly |
| 2011/0242098 | A1 | 10/2011 | Tamaru |
| 2011/0293250 | A1 | 12/2011 | Deever |
| 2012/0014673 | A1 | 1/2012 | O'Dwyer |
| 2012/0027381 | A1 | 2/2012 | Kataoka |
| 2012/0030029 | A1 | 2/2012 | Flinn |
| 2012/0057852 | A1 | 3/2012 | Devleeschouwer |
| 2012/0123780 | A1 | 5/2012 | Gao |
| 2012/0141019 | A1 | 6/2012 | Zhang |
| 2012/0210205 | A1 | 8/2012 | Sherwood |
| 2012/0246114 | A1 | 9/2012 | Edmiston |
| 2012/0283574 | A1 | 11/2012 | Park |
| 2012/0311448 | A1 | 12/2012 | Achour |
| 2013/0136193 | A1 | 5/2013 | Hwang |
| 2013/0151970 | A1 | 6/2013 | Achour |
| 2013/0166303 | A1 | 6/2013 | Chang |
| 2013/0182166 | A1 | 7/2013 | Shimokawa |
| 2013/0195429 | A1 | 8/2013 | Fay |
| 2013/0197967 | A1 | 8/2013 | Pinto |
| 2013/0208942 | A1 | 8/2013 | Davis |
| 2013/0235071 | A1 | 9/2013 | Ubillos |
| 2013/0239051 | A1 | 9/2013 | Albouze |
| 2013/0259390 | A1 | 10/2013 | Dunlop |
| 2013/0259399 | A1 | 10/2013 | Ho |
| 2013/0282747 | A1 | 10/2013 | Cheng |
| 2013/0283301 | A1 | 10/2013 | Avedissian |
| 2013/0287214 | A1 | 10/2013 | Resch |
| 2013/0300939 | A1 | 11/2013 | Chou |
| 2013/0303248 | A1* | 11/2013 | Williams ................ A63F 9/143 463/6 |
| 2013/0318443 | A1 | 11/2013 | Bachman |
| 2013/0330019 | A1 | 12/2013 | Kim |
| 2013/0343727 | A1 | 12/2013 | Rav-Acha |
| 2014/0072285 | A1 | 3/2014 | Shynar |
| 2014/0093164 | A1 | 4/2014 | Noorkami |
| 2014/0096002 | A1 | 4/2014 | Dey |
| 2014/0105573 | A1 | 4/2014 | Hanckmann |
| 2014/0149865 | A1 | 5/2014 | Tanaka |
| 2014/0152762 | A1 | 6/2014 | Ukil |
| 2014/0161351 | A1 | 6/2014 | Yagnik |
| 2014/0165119 | A1 | 6/2014 | Liu |
| 2014/0169766 | A1 | 6/2014 | Yu |
| 2014/0212107 | A1 | 7/2014 | Saint-Jean |
| 2014/0219634 | A1 | 8/2014 | McIntosh |
| 2014/0226953 | A1 | 8/2014 | Hou |
| 2014/0232818 | A1 | 8/2014 | Carr |
| 2014/0245336 | A1 | 8/2014 | Lewis, II |
| 2014/0282661 | A1 | 9/2014 | Martin |
| 2014/0300644 | A1 | 10/2014 | Gillard |
| 2014/0328570 | A1 | 11/2014 | Cheng |
| 2014/0334796 | A1 | 11/2014 | Galant |
| 2014/0341528 | A1 | 11/2014 | Mahate |
| 2014/0366052 | A1 | 12/2014 | Ives |
| 2015/0015680 | A1 | 1/2015 | Wang |
| 2015/0022355 | A1 | 1/2015 | Pham |
| 2015/0029089 | A1 | 1/2015 | Kim |
| 2015/0039646 | A1 | 2/2015 | Sharifi |
| 2015/0067811 | A1 | 3/2015 | Agnew |
| 2015/0071547 | A1 | 3/2015 | Keating |
| 2015/0113009 | A1 | 4/2015 | Zhou |
| 2015/0156247 | A1 | 6/2015 | Hensel |
| 2015/0186073 | A1 | 7/2015 | Pacurariu |
| 2015/0287435 | A1 | 10/2015 | Land |
| 2015/0318020 | A1 | 11/2015 | Pribula |
| 2015/0363644 | A1* | 12/2015 | Wnuk .................... G06T 11/206 382/103 |
| 2015/0373281 | A1 | 12/2015 | White |
| 2015/0375117 | A1 | 12/2015 | Thompson |
| 2015/0382076 | A1* | 12/2015 | Davisson ................ H04H 20/04 725/62 |
| 2015/0382083 | A1 | 12/2015 | Chen |
| 2016/0005440 | A1 | 1/2016 | Gower |
| 2016/0026874 | A1 | 1/2016 | Hodulik |
| 2016/0027470 | A1 | 1/2016 | Newman |
| 2016/0027475 | A1 | 1/2016 | Hodulik |
| 2016/0029105 | A1 | 1/2016 | Newman |

(56) References Cited

U.S. PATENT DOCUMENTS

| | | | |
|---|---|---|---|
| 2016/0055885 A1 | 2/2016 | Hodulik | |
| 2016/0094601 A1 | 3/2016 | Besehanic | |
| 2016/0103830 A1 | 4/2016 | Cheong | |
| 2016/0189752 A1 | 6/2016 | Galant | |
| 2016/0225405 A1 | 8/2016 | Matias | |
| 2016/0225410 A1 | 8/2016 | Lee | |
| 2016/0234345 A1 | 8/2016 | Roberts | |
| 2016/0260000 A1 | 9/2016 | Yamakawa | |
| 2016/0286235 A1 | 9/2016 | Yamamoto | |
| 2016/0292881 A1 | 10/2016 | Bose | |
| 2016/0358603 A1 | 12/2016 | Azam | |
| 2016/0366330 A1 | 12/2016 | Boliek | |
| 2017/0236029 A1* | 8/2017 | Howell | G06K 9/4671 382/159 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Ernoult, Emeric, "How to Triple Your YouTube Video Views with Facebook", SocialMediaExaminer.com, Nov. 26, 2012, 16 pages.
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, Dec. 17, 2015, 7 Pages.
PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding_html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding_html>.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.

* cited by examiner

SYSTEMS AND METHODS FOR DETERMINING ACTIVITIES PERFORMED DURING VIDEO CAPTURE

FIELD

This disclosure relates to systems and methods configured to determine one or more activities being performed during video capture.

BACKGROUND

Videos may be analyzed based on their semantic content to determine an activity being performed during video capture. Analyzing video content may involve techniques that are computationally expensive.

SUMMARY

This disclosure relates to determining one or more activities being performed by an entity moving with a capture device during capture of one or more videos. Information defining a video may be obtained. An entity may refer to one or more of a user, a vehicle, and/or other entities. The information defining the video may include, for example, a video file. The video file may be obtained from electronic storage of one or more video capture devices and/or other storage locations.

A system configured to determine one or more activities performed during video capture, may include one or more physical processors and/or other components. The one or more physical processors may be configured by machine-readable instructions. Executing the machine-readable instructions may cause the one or more physical processors to facilitate determining one or more activities performed during video capture. The machine-readable instructions may include one or more computer program components. The computer program components may include one or more of a video component, a location graph component, a graph attribute component, an activity component, and/or other computer program components.

The video component may be configured to obtain information defining one or more videos. Information defining a video may include one or more of content information, metadata information, and/or other information. The content information may define one or more of visual content of a video, audio content of a video, and/or other content of a video. The metadata information may include metadata associated with a video, and/or other information. The metadata may include one or more of tracking information, timing information, capture device information, user-provided information, and/or other information. The tracking information may include locations of a capture device as a function of progress through a video. The timing information may characterize tracking information as a function of progress through a video. By way of non-limiting illustration, timing information may specify individual capture durations at individual locations of a capture device. Capture device information may include one or more capture settings of a capture device, sensor output of one or more sensors coupled to the capture device, and/or other information.

The location graph component may be configured to generate one or more location graphs of one or more videos. A location graph may characterize a video by locations of a capture device as a function of progress through the video. A location graph may be generated from one or more of tracking information, timing information, and/or other information.

The graph attribute component may be configured to identify one or more graph attributes of one or more location graphs of one or more videos.

The activity component may be configured to determine one or more activity types being performed by an entity moving with a capture device during a previous capture of a video. The one or more activity types may be determined based on one or more of tracking information, timing information, individual location graphs, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
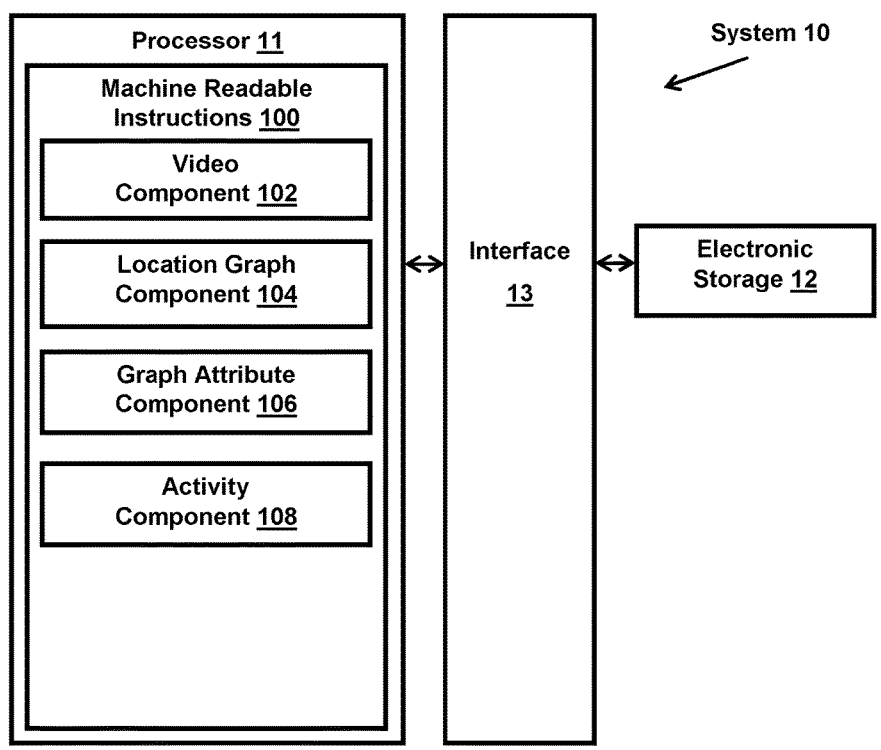
FIG. 1 illustrates a system configured to determine one or more activities performed during video capture, in accordance with one or more implementations.

FIG. 1 illustrates a system 10 configured to determine one or more activities performed during video capture, in accordance with one or more implementations. System 10 may include one or more of a processor 11, electronic storage 12, interface 13 (e.g., bus, wireless interface, etc.), and/or other components. Electronic storage 12 may include electronic storage medium that electronically stores information. Electronic storage 12 may store software algorithms, information determined by processor 11, information received remotely, and/or other information that enables system 10 to function properly. For example, electronic storage 12 may store information related to one or more of videos, frame images, extracting frame images, location graphs, graph attributes, activity types, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine readable instructions 100. Executing machine-readable instructions 100 may facilitate generating a video summary. Machine-readable instructions 100 may include one or more computer program components. Machine readable instructions 100 may include one or more of a video component 102, a location graph component 104, a graph attribute component 106, an activity component 108, and/or other computer program components.

Video component 102 may be configured to obtain information defining one or more videos, and/or other information. Information defining a video may include, for example, a video file. A video file may be obtained from electronic storage of one or more video capture devices and/or other storage locations. A video may include one or more of visual content, audio content, and/or other content. The visual content may be in the form of multiple frame images. The multiple frame images may be presented in an ordered sequence. The audio content may include recorded and/or provided audio that may accompany visual content. The audio content may be synchronized with visual content.

Information defining a video may include one or more of content information, metadata information, and/or other information. The content information may define one or more of visual content of a video, audio content of a video, and/or other content of a video. The metadata information may include metadata associated with a video, and/or other information. The metadata may include one or more of capture device information, tracking information, timing information, user-provided information, external information, and/or other information.

Capture device information may include one or more capture settings of a capture device, sensor output of one or more sensors coupled to the capture device, and/or other information.

In some implementations, capture settings of a capture device may include one or more of a resolution, a frame rate, one or more lens settings (e.g., aperture size, focal length, field-of-view, and/or other lens settings), a color saturation, a brightness, a contrast, a hue, a sharpness, depth of field, aspect ratio, and/or other capture settings.

In some implementations, sensors coupled to a capture device may include one or more of an image sensor, a geo-location sensor, orientation sensor, pressure sensor, accelerometer, and/or other sensors.

An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A geo-location sensor may generate output signals conveying tracking information. By way of non-limiting illustration, a geo-location sensor may comprise a GPS, and/or other sensors. The tracking information may include locations of a capture device as a function of progress through a video. Locations may be defined with respect to one or more of a coordinate system origin, a starting location, and/or other references. In some implementations, progress through a video may comprise one or more of real-time progress, reduced-time progress (e.g., with respect to real-time, e.g., "slow-mo"), speeded-up progress (e.g., with respect to real-time, e.g., 2× time, 3× time, etc.), and/or other progress through the video.

An orientation sensor may be configured to generate output signals conveying orientation of a capture device and/or entity moving with a capture devices. By way of non-limiting illustration, an orientation sensor may an inertial measurement unit, and/or other sensors.

A pressure sensor may be configured to generate output signals conveying one or more of ambient pressure, gauge pressure, and/or other measures of pressure. By way of non-limiting illustration, a pressure sensor may comprise one or more of a piezoresistive strain gauge, piezoelectric sensors, electromagnetic sensor, and/or other sensors.

An accelerometer may be configured to generate output signals conveying physical acceleration experienced by a capture device and/or entity moving with the capture device.

In some implementations, timing information may characterize tracking information as a function of progress through a video. By way of non-limiting illustration, timing information may specify individual capture durations at individual locations of a capture device. By way of non-limiting illustration, timing information may characterize one or more of a first location based on a first capture duration while at the first location, a second location based on a second capture duration while at the second location, and/or may characterize other locations based on other capture durations at the other locations.

In some implementations, user-provided information may include one or more of user-provided highlights of moments of interest within a video, information input by a user in a video application, and/or other information.

In some implementations, external information may include sensor output of one or more sensors external to a capture device. In some implementations, one or more sensors external to a capture device may include one or more sensors coupled to an entity moving with a capture device and/or other sensors. One or more sensors external to a capture device may include one or more of a throttle position sensor, a brake pressure sensor, a steering position sensor, and/or other sensors.

Video component 102 may obtain information defining one or more videos from one or more storage locations. A storage location may include electronic storage 12, electronic storage of one or more capture devices (not shown in FIG. 1), and/or other storage locations. Video component 102 may be configured to obtain information defining one or more videos during acquisition of the information and/or after acquisition of the information by one or more capture devices. For example, video component 102 may obtain information defining a video while the video is being captured by one or more capture devices. Video component 102 may obtain information defining a video after the video has been captured and stored in memory (e.g., electronic storage 12, etc.). By way of non-limiting illustration, information defining a video may include visual content, audio content, and/or other content previously captured by a capture device. In some implementations, one or more videos may be characterized by one or more encoded framerates. An encoded framerate may define a number of frame images within a video per a time duration (e.g., number of frame images per second, etc.).

The location graph component 104 may be configured to generate one or more location graphs for one or more videos. A location graph may be generated from information defining a video, and/or other information. A location graph may be generated from metadata information, and/or other information. A location graph may be generated from one or more of tracking information, timing information, and/or other information. A location graph may characterize a video by locations of a capture device as a function of the progress through the video. In some implementations, a location graph may comprise a set of points that individually correspond to individual locations. In some implementations, a location graph may comprise a continuous line graph that connects individual points in a set of points that correspond to individual locations.

In some implementations, a location graph may comprise one or more of a two-dimensional graph, a three-dimensional graph, and/or other types of graphs. A two-dimensional graph may characterize locations of a capture device in the real-world with respect to two coordinate directions in the real-world. By way of non-limiting illustration, a two-dimensional graph may comprise a plot of locations of a capture device as a function of progress through the video projected on a two-dimensional plane. By way of non-limiting illustration, in a real-world coordinate system comprising an X-direction, a Y-direction (orthogonal to the X-direction), and a Z-direction (corresponding to vertical movement), a location graph may characterize locations of a capture device projected onto one or more of an XY-plane, an XZ-plane, an YZ-plane, and/or other two-dimensional plane. A three-dimensional graph may characterize locations of a capture device in the real-world with respect to three coordinate directions in the real-world.

Figure 3:
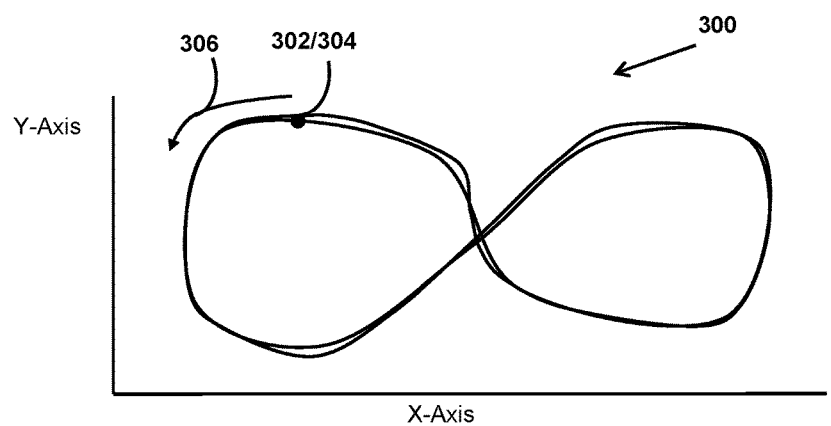
FIG. 3 illustrates an exemplary location graph for a video.
Figure 4:
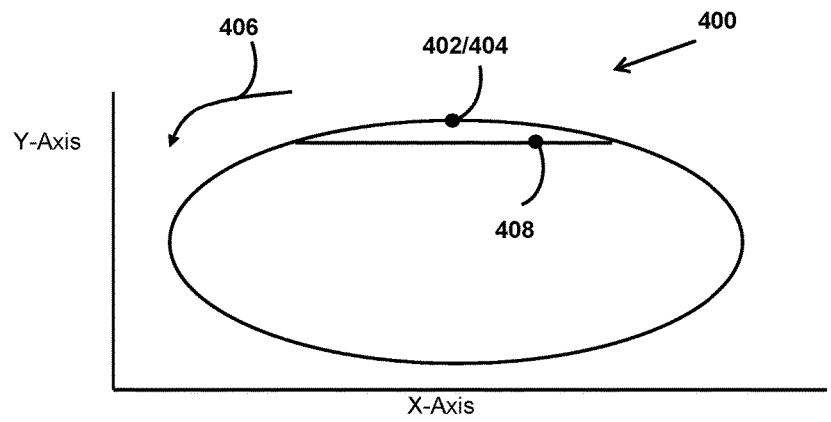
FIG. 4 illustrates an exemplary location graph for a video.
Figure 5:
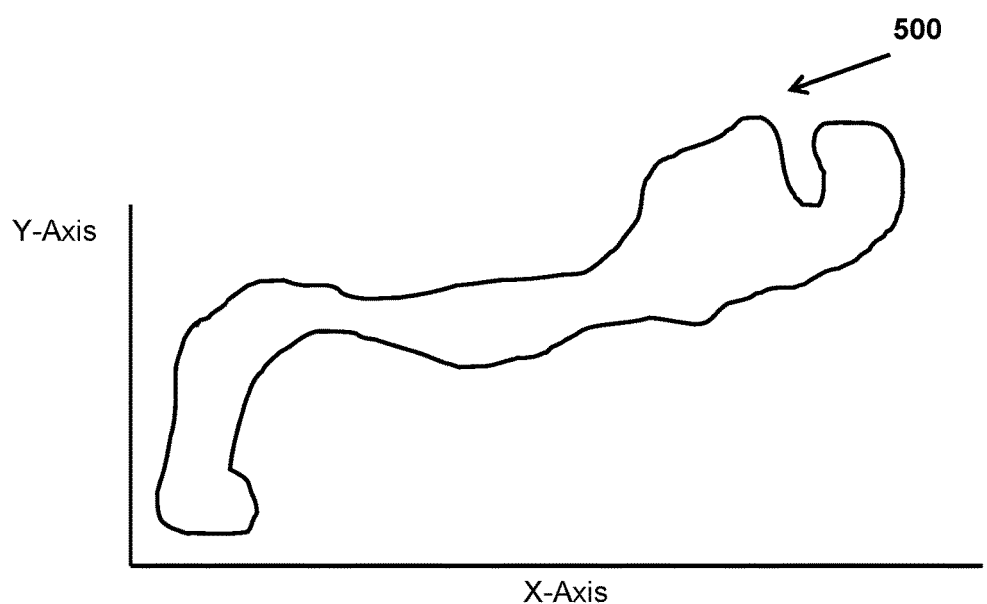
FIG. 5 illustrates an exemplary location graph for a video.

By way of non-limiting illustration, FIGS. 3-5 show exemplary location graphs 300, 400, and 500, respectively, characterizing individual videos by locations of respective capture devices as a function of the progress through the respective videos. It is noted that the depictions of location graphs 300, 400, and 500 in FIGS. 3-5 is provided for illustrative purposes only and are not intended to be limited. For example, individual location graphs may be represented by a set of discrete points, may have other shapes than those shown, and/or may have other attributes not specifically depicted in the figures.

Returning to FIG. 1, graph attribute component 106 may be configured to identify one or more graph attributes, one or more graph sub-attributes, and/or other information associated with one or more location graphs of one or more videos. In some implementations, individual graph attributes of a location graph may describe macro-features of individual location graphs. In some implementations, individual graph sub-attributes may characterize the graph attributes, and/or may describe micro-features of individual location graphs. By way of non-limiting illustration, one or more graph attributes may comprise one or more of overall shape, amount of locations conveyed by tracking information, a starting location, an ending location, and/or other graph attributes. By way of non-limiting illustration, one or more graph sub-attributes may comprise one or more of a characterization of an overall shape, capture duration between starting and ending locations, capture duration at individual locations, speed at individual locations, capture duration between individual locations, and/or other graph sub-attributes. A characterization of an overall shape may comprise one or more of a size of the shape, an amount of traversals over the shape (e.g., laps performed), a total distance traveled, a direction of travel, a location that may be specific to movement over the overall shape, and/or other information.

In some implementations, identifying one or more graph attributes and/or graph sub attributes of a location graph may be based on one or more of metadata information of a video, utilization of one or more identification techniques, and/or other information. An identification technique may comprise one or more of object recognition, edge detection, Scale-invariant feature transform (SIFT), Speeded Up Robust Features (SURF), BoW model, ridge detection, interest point detection, and/or other technique. By way of non-limiting illustration, one or more identification techniques may be configured to identify an overall shape of a location graph, and/or other graph attributes and/or graph sub-attributes. By way of non-limiting illustration, metadata information including tracking information may describe a total distance traveled, and/or other graph attributes and/or graph sub-attributes. By way of non-limiting illustration, metadata information including timing information may describe one or more of capture duration at individual locations, capture duration between individual locations, and/or other graph attributes and/or graph sub-attributes.

Referring to FIG. 3, location graph 300 may include one or more graph attributes and/or graph sub attributes that may be identified, e.g., via graph attribute component 106 (FIG. 1). By way of non-limiting illustration, location graph 300 may include one or more of a graph attribute of overall shape being "figure 8"; a graph attribute of a starting location 302 being a point on location graph 300; a graph attribute of an ending location 304 that is the same point on location graph 300; a graph sub-attribute of an amount of traversals over the shape being "2" (or "2-laps"); a graph sub-attribute of a total distance traveled being a first distance; a graph sub-attribute of a direction of travel 306; and/or other graph attributes and/or sub-attributes.

Referring to FIG. 4, location graph 400 may include one or more graph attributes and/or graph sub-attributes that may be identified, e.g., via graph attribute component 106 (FIG. 1). By way of non-limiting illustration, location graph 400 may include a graph attribute of overall shape being "oval"; a graph attribute of a starting location 402 being a point on location graph 400; a graph attribute of an ending location 404 being the same point on location graph 400; a graph sub-attribute of an amount of traversals over the shape being "10" (or "10-laps"); graph sub-attribute of a direction of travel 406; a graph sub-attribute of a capture duration at a point 408 on location graph being a first capture duration; and/or other graph attributes and/or sub-attributes.

Referring to FIG. 5, location graph 500 may include one or more graph attributes and/or graph sub-attributes that may be identified, e.g., via graph attribute component 106 (FIG. 1). By way of non-limiting illustration, location graph 500 may include a graph attribute of overall shape being the specific shape shown in the figure and/or other graph attributes and/or sub-attributes.

Returning to FIG. 1, activity component 108 may be configured to determine one or more of one or more activity types being performed by an entity moving with a capture device, one or more activity subtypes being performed by an entity moving with a capture device, and/or other information.

An activity type may comprise a classification of movement of an entity moving with a capture device. An activity subtype may characterize an activity type. By way of non-limiting illustration, an activity type may classify movement of an entity as being one or more of a race, a sport (e.g., a ball sport, extreme sport, and/or other sports), and/or other activity types. By way of non-limiting illustration, an activity subtype may characterize an activity type by specifying additional information about the activity type.

In some implementations, one or more activity types may be determined based on one or more of capture device information, tracking information, timing information, one or more location graphs, one or more location graph attributes, one or more location graph sub-attributes, and/or other information.

In some implementations, an activity type may be determined based on one or more location graph attributes, and/or other information. A location graph attribute, such as an overall shape and/or other attributes, may be indicative of a type of activity being performed by an entity moving with a capture device.

A race-type activity may be performed on a track having a known and/or recognizable shape. Based on a location graph attribute conveying an overall shape that corresponds to a known and/or recognizable race track shape, it may be determined that an entity moving with a captured device may be performing a race-type activity. For example, racing activities may be performed on a variety of known and/or recognizable shapes of race tracks. The shape of the tracks may comprise one or more of looping, figure 8, straight line, switch backs, track-specific shapes, and/or other shape tracks. Based on a location graph attribute specifying an overall shape that may match a known and/or recognizable shape of a racing activity, race type activity being performed may be determined.

By way of non-limiting illustration in FIG. 3, the specific shape of location graph 300 may correspond to a known and/or recognizable shape of a specific race track. As such, an identification of the specific shape of location graph 300 in FIG. 3 and a determination that the specific shapes corresponds to a shape of a known race track, it may be determined that an entity moving with the capture device was performing a race-type activity during video capture.

By way of non-limiting illustration in FIG. 4, the specific shape of location graph 400 may correspond to a known and/or recognizable shape of a specific race track. As such, an identification of the specific shape of location graph 400 in FIG. 4 and a determination that the specific shapes corresponds to a shape of a known race track, it may be determined that an entity moving with the capture device was performing a race-type activity.

By way of non-limiting illustration in FIG. 5, the specific shape of location graph 500 may correspond to a known and/or recognizable shape of a specific race track. As such, an identification of the specific shape of location graph 500 in FIG. 5 and a determination that the specific shapes corresponds to a shape of a known race track, it may be determined that an entity moving with the capture device was performing a race-type activity.

A sport-type activity may be performed in accordance with one or more sport-specific movements that may form a known and/or recognizable shape. Based on a location graph attribute conveying an overall shape that corresponds to a known and/or recognizable sport-specific movement, a sport-type activity being performed may be determined. The shape may comprise one or more of looping (e.g., catching and surfing a wave and paddling back to the line-up), player-specific movements in ball sports (e.g., movements of a player specified in a playbook, such as how a receiver in football may traverse a field to receive a ball, how a point guard may traverse a basketball court, traversal of a baseball player over a baseball diamond, and/or other athlete-specific movements), and/or other shapes. Based on a location graph attribute specifying an overall shape that may match a known and/or recognizable shape of athlete-specific movement, a sport-type activity may be determined.

It is noted that the above descriptions of activity types being determined based on location graph overall shape is provided for illustrative purposes only. For example, in some implementations activity types may be determined from other graph attributes and/or other information. By way of non-limiting illustration, metadata information conveying a speed of movement may be used to distinguish between a foot race and an auto race.

In some implementations, one or more activity subtypes may be determined based on one or more of capture device information, tracking information, timing information, one or more location graphs, one or more location graph attributes, one or more location graph sub-attributes, one or more activity types, and/or other information. By way of non-limiting illustration, a location graph sub-attribute, such as a characterization of an overall shape and/or other sub-attributes, may be indicative of an activity subtype being performed by an entity moving with a capture device.

In some implementations, an activity subtype of a race-type activity may characterize the race-type activity by specifying additional information about the race. Additional information may include one or more of mode of transportation (e.g., auto, motorcycle, airplane, on foot, bicycle, and/or other modes of transportation), track style (e.g., looping, figure 8, point-to-point, multi-lap, and/or other information), location the race takes place, and/or other characterization. By way of non-limiting illustration activity subtypes for a race-type activity may comprise one or more of an "auto" race, a "motorcycle" race, a "foot" race, a "bicycle" race, a "looping" race, a "point-to-point" race, a "figure 8" race, a "5-lap" race, and/or other information that may characterize a race-type activity. For example, automobiles vs motorcycles on the same track may have different patterns—motorcycles may require wider turns, may require slower speeds in corners, and/or may accelerate faster than automobiles.

In some implementations, an activity subtype of a sport-type activity may characterize the sport-type activity by specifying additional information about the sport. Additional information may include one or more of name of the sport, objective(s), location the sport takes place, and/or other information. By way of non-limiting illustration, activity subtypes specifying a name of a sport may include one or more of soccer, baseball, football, tennis, skateboarding, surfboarding, snowboarding, and/or other information that may characterize a sport-type activity.

Referring to FIG. 3, based on an overall shape of location graph 300 corresponding to a race-type activity, it may be determined that a race-type activity was performed during video capture. Based on the overall shaping being a "figure 8," it may be determined that a race-type activity was performed on a figure 8 style track. Based on the graph sub-attribute of total distance traveled being a first distance, and the first distance being in the magnitude of miles, the race-type activity may be characterized as an "auto" subtype race activity. For example, it may be common for automobiles to race on figure 8 tracks being miles long than for other types of vehicles (e.g., for example, bicycles).

Referring to FIG. 4, based on an overall shape of location graph 400 corresponding to a race-type activity, it may be determined that a race-type activity was performed. Based on the overall shaping being an "oval," it may be determined that a race-type activity was performed on a looping style track. Based on the graph sub-attribute of a capture duration at point 408 on location graph being a first capture duration, and the first capture duration being longer than capture durations at other location, the race-type activity may be characterized as "a race having pit stops."

Referring to FIG. 5, based on the overall shape of location graph 500 corresponding to a race-type activity, it may be determined that a race-type activity was performed. Based on the overall shape being specific to a known or recognizable race track having a known location and/or name, the location and/or name of the race being performed may be determined.

It is noted that determining activity type and/or activity subtype may be accomplished using additional and/or other information. In some implementations, capture device information conveying sensor output from one or more sensors of a capture device and/or other metadata information may further facilitate determining an activity type and/or activity subtype being performed. By way of non-limiting illustration, sensor output of an orientation sensor may be used to characterize an activity type being performed. For example, for a race-type activity, if a sensor output from an orientation sensor conveys multiple inversions of the capture device, it may be determined that an entity moving with the capture device was performing an airplane race (e.g., given that other modes of transportation may not likely become inverted during a race).

In some implementations, one or more activity types and/or activity subtypes may be determined by one or more machine learning techniques, and/or other techniques. Machine learning techniques may include one or more of a convolutional neural network, decision tree learning, supervised learning, minimax algorithm, unsupervised learning, semi-supervised learning, reinforcements learning, deep learning, and/or other techniques. In some implementations, one or more user-provided exemplars of location graph attributes, location graph sub-attributes, metadata information, and/or other information may be utilized at an initialization stage of a machine learning process. The user-provided exemplars may specify one or more of an activity type, activity subtype, and/or other information that may correspond to specified location graph attributes, location graph sub-attributes, metadata information, and/or other information. For example, exemplars may include track maps conveying overall shape of one or more known race tracks. The track maps may be provided as exemplars of race-type activities being performed when an overall shape corresponds to a shape of at least one of the track maps. The track maps may further be provided as exemplars of characterization of the race-type activities being performed. For example, certain race tracks may be specific to one or more of auto racing, motorcycle racing, bicycle racing, and/or other characterization of a race.

Returning to FIG. 1, although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, and/or 108 may be eliminated, and some or all of its functionality may be provided by other computer program components. As another example, processor 11 may be configured to execute one or more additional computer program components that may perform some or all of the functionality attributed to one or more of computer program components 102, 104, 106, and/or 108 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
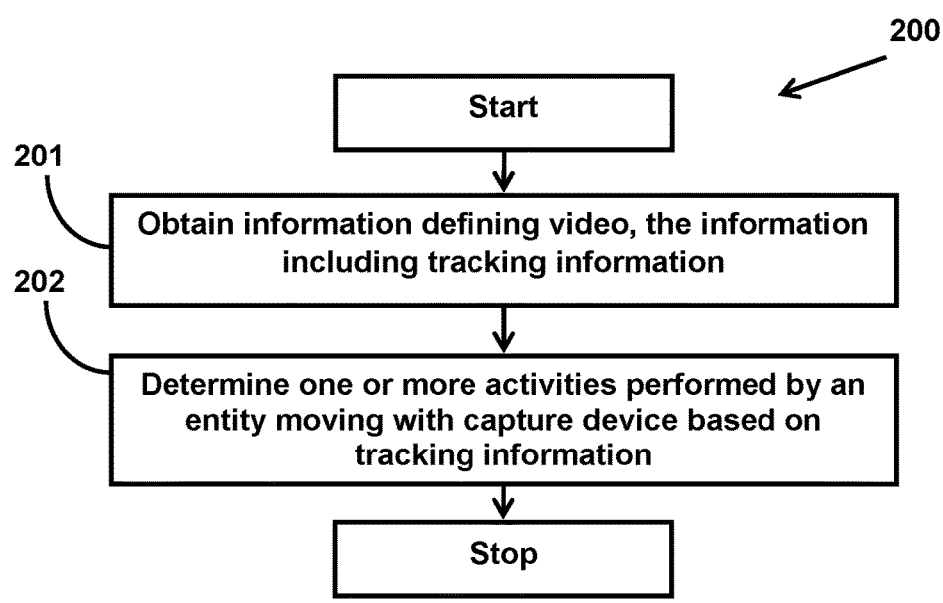
FIG. 2 illustrates a method of determining one or more activities performed during video capture, in accordance with one or more implementations.

FIG. 2 illustrates method 200 of determining one or more activities performed during video capture, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, information defining a video may be obtained. The video may include visual content previously captured by a capture device, and/or other content. The information defining the video may include content information, metadata information, and/or other information. The content information may define the visual content. The metadata information may include tracking information, and/or other information. The tracking information may include locations of a capture device as a function of progress through the video. The locations may include a first set of locations. In some implementations, operation 201 may be performed by a processor component the same as or similar to video component 102 (shown in FIG. 1 and described herein).

At operation 202, one or more activity types being performed by an entity moving with the capture device during a previous capture may be determined. The one or more activity types may be determined based on tracking information and/or other information. By way of non-limiting illustration, a first activity type may be determined based on the first set of locations, and/or other information. In some implementations, operation 202 may be performed by a processor component the same as or similar to activity component 108 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to recognize one or more activities performed during video capture, the system comprising:
one or more physical processors configured by machine-readable instructions to:
obtain information defining a video, the video including visual content previously captured by a capture device over a capture duration, the information defining the video including content information and metadata information, the content information defining the visual content, the metadata information including tracking information, the tracking information including locations of the capture device as a function of progress through the capture duration, the locations including a first set of locations; and
determine a type of activity being performed by an entity moving with the capture device over the capture duration based on the tracking information, wherein the determining the type of activity being performed by the entity moving with the capture device over the capture duration based on the tracking information comprises:
generating a location graph for the video using the tracking information the location graph including the first set of locations of the capture device as the function of the progress through the capture duration;
identifying an overall shape of the location graph; and
determining the type of activity being performed by the entity moving with the capture device based on the overall shape of the location graph, wherein determining the type of activity includes distinguishing between a sport-type activity and a race-type activity based on the overall shape of the location graph.

2. The system of claim 1, wherein the type of activity is determined to be a sport-type activity based on the overall shape of the location graph matching a shape of an athlete-specific movement.

3. The system of claim 1, wherein the location graph is a two-dimensional graph characterizing the locations of the capture device with respect to two coordinate directions of movement.

4. The system of claim 1, wherein the type of activity is determined to be a race-type activity based on the overall shape of the location graph matching a shape of a track.

5. The system of claim 1, wherein the determining the type of activity being performed by the entity moving with the capture device over the capture duration based on the tracking information further comprises:
identifying a speed of the entity moving with the capture device; and
determining a sub-type of the type of activity being performed by the entity moving with the capture device based on the speed of the entity.

6. The system of claim 5, wherein different sub-types correspond to different types of vehicles or equipment used by the entity.

7. The system of claim 1, wherein the metadata information further includes timing information, the timing information characterizing the tracking information as the function of the progress through the capture duration.

8. The system of claim 1, wherein the video further includes audio content, and wherein the content information further defines the audio content of the video.

9. The system of claim 1, wherein a trained neural network is utilized to determine the type of activity.

10. The system of claim 1, wherein the progress through the capture duration is represented as one or more of real-time progress, reduced-time progress, or speeded-up progress.

11. A method of recognizing one or more activities performed during video capture, the method being implemented by a computer system comprising one or more physical processors and non-transitory storage media storing machine-readable instructions, the method comprising:
obtaining information defining a video, the video including visual content previously captured by a capture device over a capture duration, the information defining the video including content information and metadata information, the content information defining the visual content, the metadata information including tracking information, the tracking information including locations of the capture device as a function of progress through the capture duration, the locations including a first set of locations; and
determining a type of activity being performed by an entity moving with the capture device over the capture duration based on the tracking information, wherein the determining the type of activity being performed by the entity moving with the capture device over the capture duration based on the tracking information comprises:
generating a location graph for the video using the tracking information, the location graph including the first set of locations of the capture device as the function of the progress through the capture duration;
identifying an overall shape of the location graph; and
determining the type of activity being performed by the entity moving with the capture device based on the overall shape of the location graph, wherein determining the type of activity includes distinguishing between a sport-type activity and a race-type activity based on the overall shape of the location graph.

12. The method of claim 11, wherein the type of activity is determined to be a sport-type activity based on the overall shape of the location graph matching a shape of an athlete-specific movement.

13. The method of claim 11, wherein the location graph is a two-dimensional graph characterizing the locations of the capture device with respect to two coordinate directions of movement.

14. The method of claim 11, wherein the type of activity is determined to be a race-type activity based on the overall shape of the location graph matching a shape of a track.

15. The method of claim 11, wherein the determining the type of activity being performed by the entity moving with the capture device over the capture duration based on the tracking information further comprises:
identifying a speed of the entity moving with the capture device; and
determining a sub-type of the type of activity being performed by the entity moving with the capture device based on the speed of the entity.

16. The method of claim 15, wherein different sub-types correspond to different types of vehicles or equipment used by the entity.

17. The method of claim 11, wherein the metadata information further includes timing information, the timing information characterizing the tracking information as the function of the progress through the capture duration.

18. The method of claim 11, wherein the video further includes audio content, and wherein the content information further defines the audio content of the video.

19. The method of claim 11, wherein a trained neural network is utilized to determine the type of activity.

20. The method of claim 11, wherein the progress through the capture duration is represented as one or more of real-time progress, reduced-time progress, or speeded-up progress.

* * * * *